US010580389B1

(12) United States Patent
Tiana et al.

(10) Patent No.: US 10,580,389 B1
(45) Date of Patent: Mar. 3, 2020

(54) HEAD TRACKING SYSTEM FOR HEAD WEARABLE DEVICE INCLUDING DISPLAY DEVICE

(71) Applicant: Rockwell Collins, Inc., Cedar Rapids, IA (US)

(72) Inventors: Carlo L. Tiana, Portland, OR (US); Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 32 days.

(21) Appl. No.: 16/104,292

(22) Filed: Aug. 17, 2018

(51) Int. Cl.
| | | |
|---|---|---|
| *G09G 5/38* | (2006.01) | |
| *G02B 27/01* | (2006.01) | |
| *G02B 27/00* | (2006.01) | |
| *B64D 43/00* | (2006.01) | |

(52) U.S. Cl.
CPC .............. *G09G 5/38* (2013.01); *B64D 43/00* (2013.01); *G02B 27/0093* (2013.01); *G02B 27/0172* (2013.01); *G02B 2027/014* (2013.01); *G02B 2027/0178* (2013.01); *G09G 2340/0464* (2013.01); *G09G 2340/0492* (2013.01); *G09G 2354/00* (2013.01); *G09G 2380/12* (2013.01)

(58) Field of Classification Search
None
See application file for complete search history.

(56) References Cited

U.S. PATENT DOCUMENTS

| | | | | |
|---|---|---|---|---|
| 6,078,427 | A * | 6/2000 | Fontaine | G02B 27/0093 345/7 |
| 7,130,447 | B2 * | 10/2006 | Aughey | A61B 3/113 382/103 |
| 9,092,898 | B1 * | 7/2015 | Fraccaroli | G06T 19/006 |
| 9,830,713 | B1 * | 11/2017 | Walker | H04N 5/247 |
| 2006/0134583 | A1 * | 6/2006 | Gonzalez de Mendoza y Kaeding | A63B 24/00 434/55 |
| 2007/0132662 | A1 * | 6/2007 | Morita | G06F 3/014 345/8 |
| 2010/0017047 | A1 * | 1/2010 | Sanders-Reed | G06F 3/14 701/3 |
| 2016/0005233 | A1 * | 1/2016 | Fraccaroli | G02B 27/0172 345/633 |
| 2017/0228928 | A1 * | 8/2017 | Terahata | G06F 3/012 |
| 2018/0025531 | A1 * | 1/2018 | Terahata | G02B 27/017 345/421 |
| 2018/0093177 | A1 * | 4/2018 | Tokubo | G06F 3/012 |
| 2018/0196506 | A1 * | 7/2018 | Nakashima | G06F 3/012 |

(Continued)

*Primary Examiner* — David D Davis
(74) *Attorney, Agent, or Firm* — Suiter Swantz pc llo

(57) ABSTRACT

A system may include a structure, a head wearable device, emitters, receivers, and a processor. The emitters may be configured to emit signals and may be implemented on at least one of the structure or the head wearable device. The receivers may be configured to receive at least some of the signals from the emitters, to detect at least one signal property including signal intensity of the received signals, and to output information of the at least one signal property as signal data. The receivers may be implemented on at least one of the structure or the head wearable device. A processor may be configured to: receive the signal data from the receivers; determine a position and an orientation of the head wearable device based on the signal data; and output image or symbolic data to the head wearable device to be displayed by the head wearable device.

22 Claims, 14 Drawing Sheets

(56) References Cited

U.S. PATENT DOCUMENTS

2018/0341386 A1* 11/2018 Inomata .............. G06F 3/04815
2019/0027113 A1* 1/2019 Kaine .................... G09G 5/006
2019/0317718 A1* 10/2019 George ................ G06T 19/006

* cited by examiner

HEAD TRACKING SYSTEM FOR HEAD WEARABLE DEVICE INCLUDING DISPLAY DEVICE

BACKGROUND

Head wearable devices for certified commercial aircraft applications require very accurate, certifiable and high-assurance head tracking methods. Redundant and/or high design assurance level (DAL) monitored systems are typically required because head position with respect to a platform, and platform with respect to earth, is a critical portion of a head wearable device for placement of information accurately conformal to the real world. Previous solutions have included various technologies including magnetic head tracking systems, inertial head tracking systems, and camera-based head tracking systems that link a head position to a cockpit environment. Each existing solution has had drawbacks in terms of accuracy, susceptibility to electromagnetic interference (EMI) and/or magnetic perturbances, cost, bandwidth, or latency requirements.

SUMMARY

In one aspect, embodiments of the inventive concepts disclosed herein are directed to a system. The system may include a structure, a head wearable device, emitters, receivers, and a computing device. The head wearable device may be implemented in proximity to the structure. The head wearable device may include a head wearable device processor and a display device. The emitters may be configured to emit electromagnetic signals and may be implemented on at least one of the structure or the head wearable device. The receivers may be configured to receive at least some of the electromagnetic signals from the emitters, to detect at least one signal property including signal intensity of the at least some of the electromagnetic signals, and to output information of the at least one signal property as electromagnetic signal data. The receivers may be implemented on at least one of the structure or the head wearable device. The computing device may include a processor and may be communicatively coupled to the head wearable device and the receivers. The processor may be configured to: receive the electromagnetic signal data from the receivers; determine a position and an orientation of the head wearable device at a given time with respect to the structure based on the electromagnetic signal data; and output image and/or symbolic data to the head wearable device to be displayed by the display device of the head wearable device, the image and/or symbolic data being aligned with the position and the orientation of the head wearable device with respect to the at least one structure.

In a further aspect, embodiments of the inventive concepts disclosed herein are directed to a cockpit head tracking system. The cockpit head tracking system may include a cockpit structure implemented in an aircraft, a head wearable device, emitters, receivers, and a computing device. The head wearable device may be implemented in proximity to the cockpit structure and in a cockpit of the aircraft. The head wearable device may include a head wearable device processor and a display device. The emitters may be configured to emit electromagnetic signals and may be implemented on at least one of the cockpit structure or the head wearable device. The receivers may be configured to receive at least some of the electromagnetic signals from the emitters, to detect at least one signal property including signal intensity of the at least some of the electromagnetic signals, and to output information of the at least one signal property as electromagnetic signal data. The receivers may be implemented on at least one of the cockpit structure or the head wearable device. The computing device may include a processor and may be communicatively coupled to the head wearable device and the receivers. The processor may be configured to: receive the electromagnetic signal data from the receivers; determine a position and an orientation of the aircraft with respect to earth; determine a position and orientation of the head wearable device with respect to the at least one cockpit structure and to earth based at least on the electromagnetic signal data; and output image and/or symbolic data to the head wearable device to be displayed by the display device of the head wearable device, wherein the image and/or symbolic data is aligned with the position and the orientation of the head wearable device with respect to the at least one cockpit structure and to earth.

In a further aspect, embodiments of the inventive concepts disclosed herein are directed to a method for operating a head tracking system. The method may include receiving, by a processor of a computing device, electromagnetic signal data from receivers. The receivers may be configured to receive at least some of electromagnetic signals from emitters, to detect at least one signal property including signal intensity of the at least some of the electromagnetic signals, and to output information of the at least one signal property as the electromagnetic signal data to the computing device. The receivers may be implemented on at least one of a structure or a head wearable device. The emitters may be configured to emit the electromagnetic signals. The emitters may be implemented on at least one of the structure or the head wearable device. The head wearable device may be implemented in proximity to the structure. The head wearable device may include a head wearable device processor and a display device. The computing device may be communicatively coupled to the head wearable device and the receivers. The method may include determining, by the processor, a position and an orientation of the head wearable device at a given time with respect to the structure based on the electromagnetic signal data. The method may include outputting, by the processor, image and/or symbolic data to the head wearable device to be displayed by the display device of the head wearable device, the image and/or symbolic data being aligned with the position and the orientation of the head wearable device with respect to the structure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
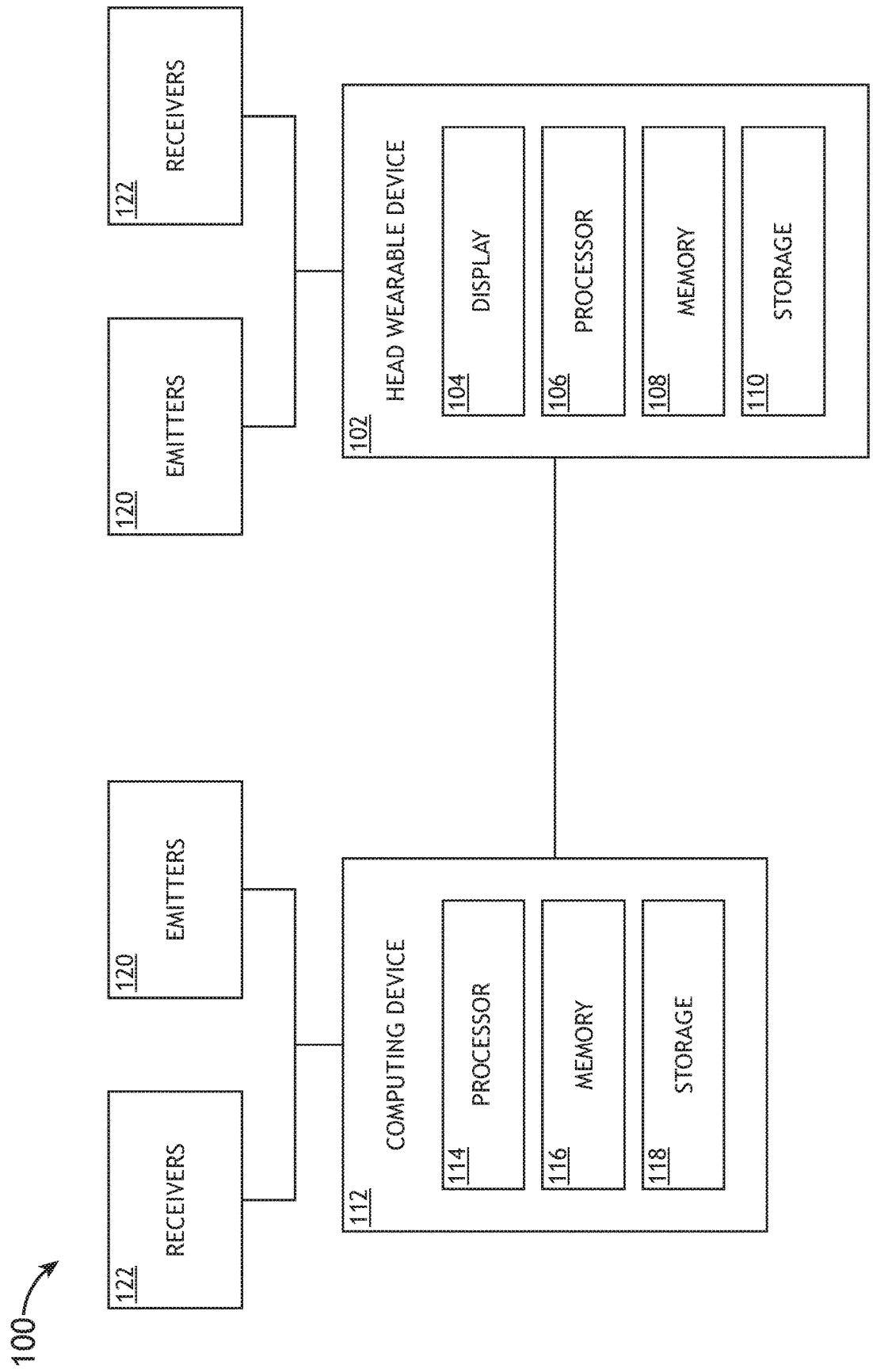
FIG. 1 is a view of an exemplary embodiment of a system including a head wearable device, a computing device, emitters, and receivers according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a head tracking system and a method. The head tracking system may be less complex and have a lower cost than currently implemented head tracking systems. The head tracking system may provide high-resolution in-cockpit head tracking at high DAL, as required by many commercial head wearable device systems.

Referring now to FIG. 1, an exemplary embodiment of a system 100 (e.g., a head tracking system) according to the inventive concepts disclosed herein includes at least one head wearable device 102, at least one computing device 112, emitters 120, and receivers 122, some or all of which may be communicatively coupled at any given time. The system 100 may be implemented in any suitable environment, such as in a vehicle cabin, in a cockpit of an aircraft, or in a room.

The emitters 120 may be configured to emit electromagnetic signals in any suitable electromagnetic wavelength. For example, the emitters 120 may be configured to emit infrared (IR) signals. The emitters 120 may be implemented as any suitable emitters configured to emit electromagnetic signals. For example, the emitters may be implemented as lasers (e.g., vertical-cavity surface-emitting lasers (VCSELs)) or light emitting diodes (LEDs) (e.g., infrared LEDs (IR-LEDs)). The emitters 120 may be configured to emit electromagnetic signals having any suitable beam patterns, such as pencil beam patterns, fan beam patterns, omnidirectional beam patterns, or a combination thereof. For examples, the emitters 120 may be arranged and configured to have perpendicular fan beam patterns, overlapping fan beam patterns, and/or intersecting fan beams. While FIG. 1 exemplarily depicts emitters 120 coupled to the head wearable device 102 and the computing device 112, in some embodiments, the emitters 120 may be coupled to only one of the head wearable device 102 or the computing device 112.

One, some, or all of the emitters 120 may be configured to emit particular electromagnetic signals having particular unique signal properties. For example, the particular unique signal properties may include an at least semi-unique pulse frequency, an at least semi-unique signal code, an at least semi-unique polarization, an at least semi-unique signal wavelength, or a combination thereof. Additionally, for example, each of some or all of the emitters 120 having particular unique signal properties may be paired or matched with one or more corresponding receivers 122. For example, a particular paired or matched receiver 122 may be configured to receive particular electromagnetic signals having particular unique signal properties from a particular paired emitter 120 and to filter out electromagnetic signals other than the particular electromagnetic signals having the particular unique signal properties. The unique signal properties may allow the computing device 112 to identify a signal as originating from a specific emitter 120. For example, some or all of the emitters 120 may be configured to emit particular electromagnetic signals having unique pulse frequencies (e.g., 38 kilohertz (kHz), 39 kHz, and 40 kHz) that are configured to be received by particular matched receivers (e.g., each matched receiver configured to receive 38 kHz, 39 kHz, or 40 kHz pulse frequency signals and configured to filter out signals having other pulse frequencies). For example, some or all of the emitters 120 may be configured to emit particular electromagnetic signals having unique wavelengths (e.g., 900 nanometers (nm), 950 nm, and 1000 nm) that are configured to be received by particular matched receivers (e.g., each matched receiver configured to receive 900 nanometers (nm), 950 nm, or 1000 nm wavelength signals and configured to filter out signals having other wavelengths). For example, some or all of the emitters 120 may be configured to emit particular electromagnetic signals having unique signal codes (e.g., pulse modulate codes) that are configured to be received by particular matched receivers (e.g., each matched receiver configured to receive a particular pulse module code signal and configured to filter out signals having other pulse modulate codes).

The emitters 120 may be implemented on the head wearable device 102, at least one structure (e.g., 202; e.g., a cockpit structure, a panel, a window, a wall, ceiling, a surface, a post, a cabinet, and/or a shelf), or a combination thereof. In some embodiments, some or all of the emitters 120 (e.g., implemented on the head wearable device 102 or the at least one structure (e.g., 202)) may be implemented in clusters (e.g., 204) of at least two emitters 120. The at least two emitters 120 of each cluster (e.g., 204) may be arranged generally linearly. The clusters may include a first cluster and a second cluster, and the first cluster and the second cluster may be arranged in a non-parallel manner.

The receivers 122 may be configured to receive at least some of the electromagnetic signals from the emitters 120. The receivers 122 may be configured to detect signal properties (e.g., signal intensity, pulse frequency, signal code, signal polarization, signal wavelength, or a combination thereof) of received electromagnetic signals and to output information of such signal properties as electromagnetic signal data to the computing device 112. For example, the detected signal properties may include signal intensity. Particular receivers 122 may be matched or paired with particular emitters 120. For example, each of at least some of the receivers 122 may be configured to receive particular electromagnetic signals having particular unique signal properties from a particular emitter 120 while being configured to filter out signals lacking the particular unique signal properties. While FIG. 1 exemplarily depicts receivers 122 coupled to the head wearable device 102 and the computing device 112, in some embodiments, the receivers 122 may be coupled to only one of the head wearable device 102 or the computing device 112.

The receivers 122 may be implemented on the head wearable device 102, at least one structure (e.g., 202; e.g., a cockpit structure, a panel, a window, a wall, ceiling, a surface, a post, a cabinet, and/or a shelf), or a combination thereof. Additionally, in some embodiments and similar to clusters (e.g., 204) of emitters 120, some or all of the receivers 122 (e.g., implemented on the head wearable device 102 or the at least one structure (e.g., 202)) may be implemented in clusters of at least two receivers 122. The at least two receivers 122 of each cluster may be arranged generally linearly. The clusters may include a first cluster and a second cluster, and the first cluster and the second cluster may be arranged in a non-parallel manner.

The computing device 112 may include at least one processor 114, at least one memory 116, and at least one storage device 118, as well as other components, equipment, and/or devices commonly included in a computing device, some or all of which may be communicatively coupled. The processor 114 may be implemented as any suitable processor, such as a general purpose processor or a field programmable gate array (FPGA). The processor 114 may be configured to run various software applications or computer code stored (e.g., maintained) in a non-transitory computer-readable medium (e.g., memory 116 and/or storage 118) and configured to execute various instructions or operations. The computing device 112 may be implemented as any suitable computing device. In some embodiments, the computing device 112 is implemented as a vetronics computing device (e.g., an avionics computing device) in a vehicle, such as an aircraft or automobile. Additionally, for example, the computing device 112 or the processor 114 may be implemented as a special purpose computer or a special purpose processor configured (e.g., programmed) to execute instructions for performing any or all of the operations disclosed throughout. In some embodiments, the system of FIG. 1 may include any suitable number of computing devices 112. While the computing device 112 exemplarily includes elements as shown, in some embodiments, one or more of the elements of the computing device 112 may be omitted, or the computing device 112 may include other elements.

For example, the processor 114 of the computing device 112 may be configured to receive electromagnetic signal data from the receivers 122. Additionally, the processor 114 may be configured to determine a position and an orientation of the head wearable device 102 at a given time with respect to the at least one structure (e.g., 202) based at least on the electromagnetic signal data. Further, the processor 114 may be configured to output image and/or geo-referenced symbolic data to the head wearable device 102 to be displayed by a display device (e.g., 104) of the head wearable device 102. The image and/or geo-referenced symbolic data may be aligned with the position and the orientation of the head wearable device 102 with respect to the at least one structure (e.g., 202).

In some embodiments, such as where the system 100 is implemented in a vehicle (e.g., an aircraft or an automobile), the processor 114 may be further configured to determine a position and an orientation of the vehicle with respect to earth and to determine a position and orientation of the head wearable device 102 with respect to the at least one structure (e.g., 202) and to earth based at least on the electromagnetic signal data, wherein the image and/or geo-referenced symbolic data may be aligned with the position and the orientation of the head wearable device 102 with respect to the at least one structure (e.g., 202) and to earth. For example, the computing device 112 may receive vehicle position and orientation data from an inertial reference unit or global positioning system (GPS) device to determine a position and orientation of the vehicle. In some embodiments, such as where the system 100 is implemented in an aircraft, the at least one structure (e.g., 202) may be at least one cockpit structure, and the head wearable device 102 may be implemented in a cockpit of the aircraft.

In some embodiments, where at least some of the emitters 120 are implemented on the head wearable device 102 and where at least some of the receivers 122 are implemented on the at least one structure (e.g., 202), the processor 114 being configured to determine the position and the orientation of the head wearable device at the given time with respect to the at least one structure based at least on the electromagnetic signal data may include the processor 114 being configured to: identify particular emitters 120 based at least on particular unique signal properties associated with the particular emitters 120, wherein the particular emitters 120 are implemented on the head wearable device 102; and determine angular orientations and three-dimensional positions of the particular emitters 120 with respect to the at least one structure (e.g., 202) at the given time at least by comparing received signal strengths associated with at least one of the particular emitters 120 against received signal strengths associated with at least another of the particular emitters 120. For example, by comparing received signal strengths associated with at least one of the particular emitters 120 against received signal strengths associated with at least another of the particular emitters 120, the processor 114 may be configured to determine angular orientations between the particular emitters 120 and corresponding matched receivers 122. Additionally, for example, based on the determination of the angular orientations between the particular emitters 120 and corresponding matched receivers 122 and based on predetermined stationary positions of the corresponding matched receivers 122, the processor 114 may be configured to determine the three-dimensional positions of the particular emitters 120, such as by triangulation. Further, based on the determined the three-dimensional positions and/or angular orientations of the particular emitters 120, the processor 114 may be configured to determine a position and an orientation of the head wearable device 102 at a given time.

In some embodiments, where at least some of the emitters 120 are implemented on the at least one structure (e.g., 202) and where at least some of the receivers 122 are implemented on the head wearable device 102, the processor 114 being configured to determine the position and the orientation of the head wearable device 102 at the given time with respect to the at least one structure based at least on the electromagnetic signal data may include the processor 114 being configured to: identify particular emitters 120 based at least on particular unique signal properties associated with the particular emitters 120; and determine angular orientations and three-dimensional positions of particular receivers 122 with respect to the at least one structure (e.g., 202) at the given time at least by comparing received signal strengths associated with at least one of the particular emitters 120 against received signal strengths associated with at least another of the particular emitters 120, wherein the particular receivers 122 are implemented on the head wearable device 102. For example, by comparing received signal strengths associated with at least one of the particular emitters 120 against received signal strengths associated with at least another of the particular emitters 120, the processor 114 may be configured to determine angular orientations between the particular emitters 120 and the corresponding particular receivers 122, which may be matched. Additionally, for example, based on the determination of the angular orientations between the particular emitters 120 and the corresponding particular receivers 122 and based on predetermined stationary positions of the particular matched emitters 120, the processor 114 may be configured to determine the three-dimensional positions of the particular receivers 122, such as by triangulation. Further, based on the determined the three-dimensional positions and/or angular orientations of the particular receivers 122, the processor 114 may be configured to determine a position and an orientation of the head wearable device 102 at a given time.

In some embodiments, where some of the emitters 120 are implemented on the at least one structure (e.g., 202) and other of the emitters 120 are implemented on the head wearable device 102 and where some of the receivers 122 are implemented on the at least one structure (e.g., 202) and other of the receivers 122 are implemented on the head wearable device 102, the processor 114 being configured to determine the position and the orientation of the head wearable device at the given time with respect to the at least one structure based at least on the electromagnetic signal data may include the processor 114 being configured to: identify particular emitters 120 based at least on particular unique signal properties associated with the particular emitters 120, wherein the particular emitters 120 are implemented on the head wearable device 102; determine angular orientations and three-dimensional positions of the particular emitters 120 with respect to the at least one structure (e.g., 202) at the given time at least by comparing received signal strengths associated with at least one of the particular emitters 120 against received signal strengths associated with at least another of the particular emitters 120; determine angular orientations and three-dimensional positions of particular receivers 122 with respect to the at least one structure (e.g., 202) at the given time at least by comparing received signal strengths associated with at least one of the other emitters 120 against received signal strengths associated with at least another of the other emitters 120, wherein the particular receivers 122 are implemented on the head wearable device 102; and determine the position and the orientation of the head wearable device 102 at the given time with respect to the at least one structure (e.g., 202) based at least on the determined angular orientations and three-dimensional positions of the particular emitters 120 and the determined angular orientations and three-dimensional positions of the particular receivers 122. For example, the determined angular orientations and three-dimensional positions of the particular emitters 120 and the determined angular orientations and three-dimensional positions of the particular receivers 122 may be used to determine (e.g., compute) an average position and orientation of the head wearable device 102 at the given time, which may reduce an average amount of error in measuring position and orientation of the head wearable device 102 at the given time. By determining angular orientations and three-dimensional positions of the particular emitters 120 implemented on the head wearable device 102 and determining angular orientations and three-dimensional positions of the particular receivers 122 implemented on the head wearable device 102, the processor 102 can determine the position and the orientation of the head wearable device 102 at the given time with increased accuracy as compared to using a single estimate of position and orientation.

The head wearable device 102 may include at least one display device 104, at least one processor 106, at least one memory 108, and at least one storage device 110, some or all of which may be communicatively coupled and/or optically coupled at any given time. The head wearable device 102 may be implemented as an augmented reality head wearable device or a mixed reality head wearable device. The head wearable display device 110 may be configured to display images to a user of the head wearable device 102.

The processor 106 may be implemented as any suitable processor, such as a general purpose processor, an FPGA, and/or an image processor. For example, the processor 106 may be configured to receive image and/or geo-referenced symbolic data from the computing device 112 and output image and/or geo-referenced symbolic data to the display device 104 for presentation to the user, wherein the image and/or geo-referenced symbolic data may be aligned with the position and the orientation of the head wearable device with respect to the at least one structure. Additionally, the processor 106 may perform any of the operations disclosed throughout, such as operations described as being capable of being performed by the processor 114 of the computing device 112. The processor 106 may be configured to run various software applications or computer code stored (e.g., maintained) in a non-transitory computer-readable medium (e.g., memory 108 and/or storage 110) and configured to execute various instructions or operations. Additionally, for example, the processor 106 may be implemented as a special purpose processor configured (e.g., programmed) to execute instructions for performing any or all of the operations disclosed throughout. In some embodiments, the system of FIG. 1 may include any suitable number of processors 106.

Figure 2:
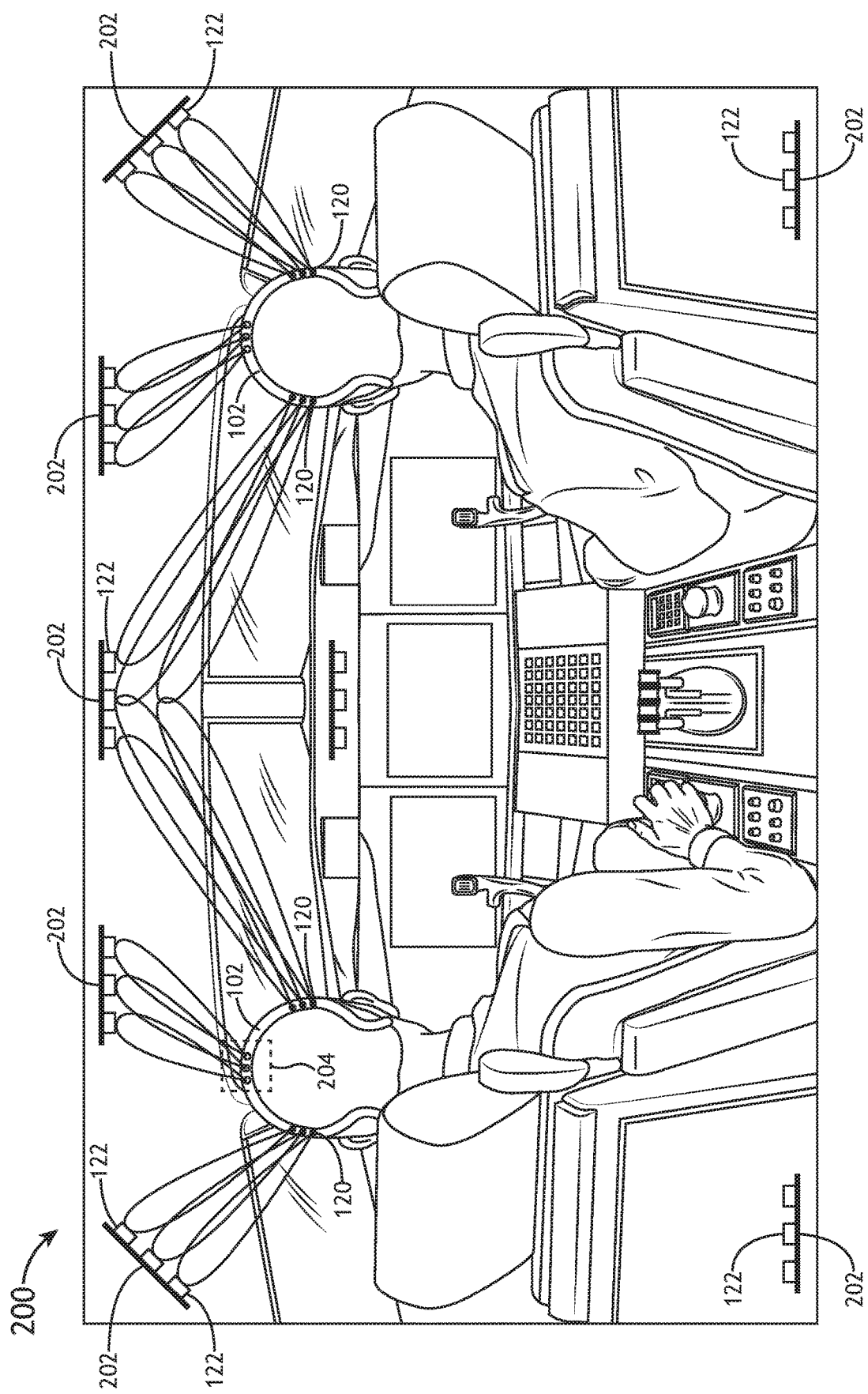
FIG. 2 is a view of the system of FIG. 1 implemented in a cockpit of an aircraft according to the inventive concepts disclosed herein.

Referring now to FIG. 2, an exemplary embodiment of the system 100 (e.g., a head tracking system) of FIG. 1 implemented in a cockpit 200 of an aircraft according to the inventive concepts disclosed herein is depicted.

Pilots may wear and use the head wearable devices 102. Clusters 204 of at least two emitters 120 may be implemented on the head wearable devices 102. For example, clusters 204 of three emitters 120 may be implemented on sides, a top, and forehead area of the head wearable devices 102. The clusters 204 of emitters 120 may be configured to emit signals having overlapping fan beam patterns; however, any suitable beam pattern may be emitted. Each of the emitters 120 may be matched with at least one receiver 122 positioned around and in proximity to said emitter 120.

The cockpit 200 may include receivers 122 implemented on structures 202 (e.g., cockpit structures) located at various positions (e.g., at various locations on the ceiling, at various locations behind and/or above seats, at various locations along edges of windows, at various locations along edges of displays, and/or at various locations on walls) in the cockpit 200. The receivers 122 may be arranged in clusters (e.g., clusters of three receivers 122, as shown).

While FIG. 2 exemplarily depicts emitters 120 located on the head wearable device 102 and receivers 122 implemented on the cockpit structures 202, in some embodiments, the emitters 120 may be implemented on either or both of the head wearable device 102 or the cockpit structures 202, and similarly, the receivers 122 may be implemented on either or both of the head wearable device 102 or the cockpit structures 202.

Figure 3:
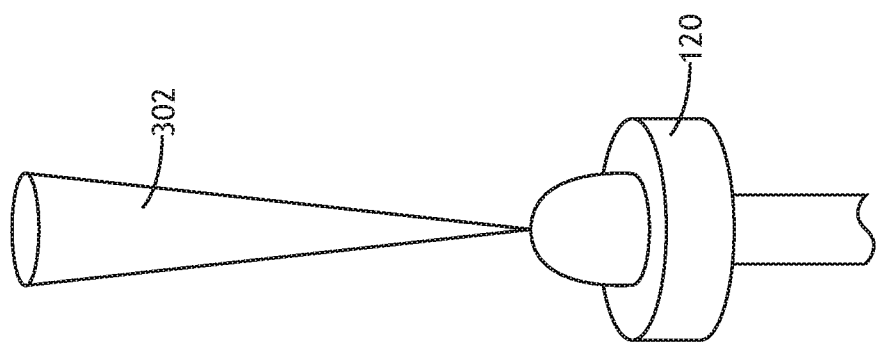
FIG. 3 is a view of an emitter of FIG. 1 according to the inventive concepts disclosed herein.

Referring now to FIG. 3, an exemplary embodiment of an emitter 120 according to the inventive concepts disclosed herein is depicted. As shown, the emitter 120 may be configured to emit signals having a pencil beam pattern 302. The pencil beam pattern may be shaped as a narrow cone or cylinder. For example, suitable pencil beam patterns may be cone-shaped with less than 1 degree of spread (e.g., about 0.1 degree of spread).

Figure 4:
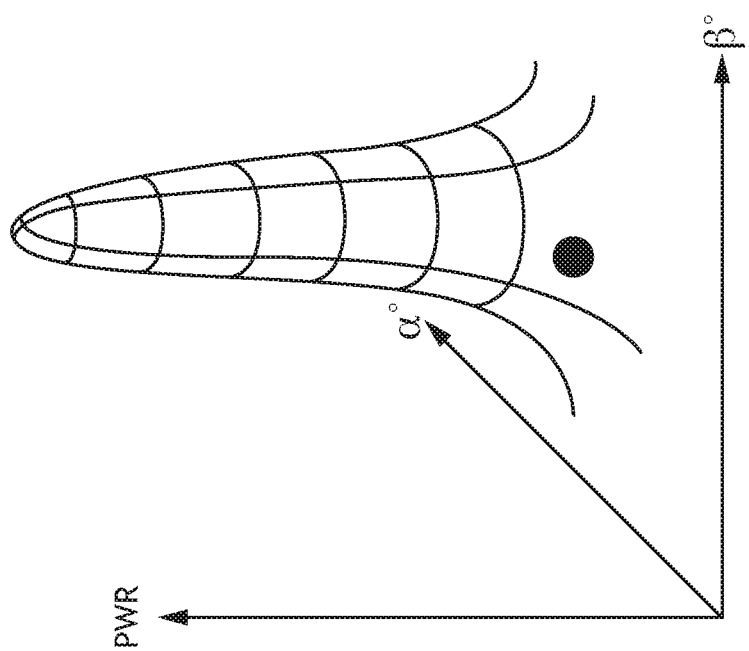
FIG. 4 is a graph of angles versus received power with respect to the emitter of FIG. 3 according to the inventive concepts disclosed herein.

Referring now to FIG. 4, a graph of angles versus received power (e.g., by a receiver 122) with respect to the emitter 120 having pencil beam pattern 302 of FIG. 3 is shown. The graph demonstrate that received signal intensities are present at very isolated angles corresponding to the pencil beam pattern 302.

Figure 5:
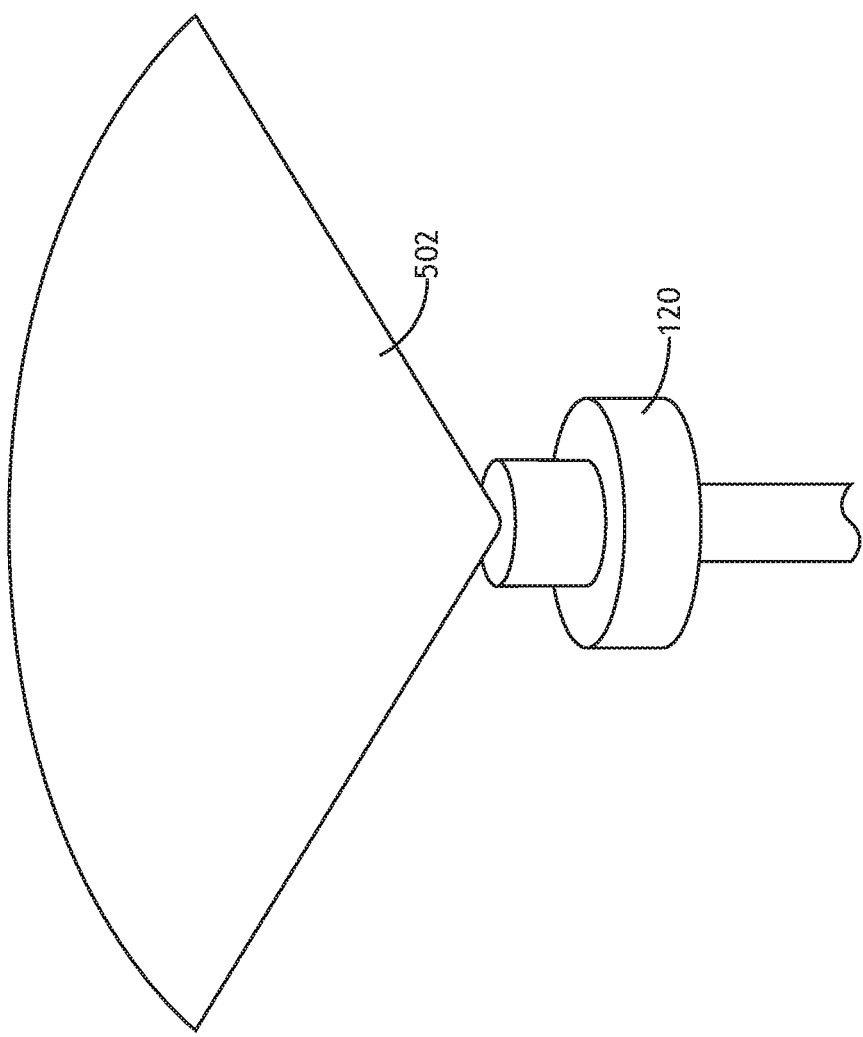
FIG. 5 is a view of an emitter of FIG. 1 according to the inventive concepts disclosed herein

Referring now to FIG. 5, an exemplary embodiment of an emitter 120 according to the inventive concepts disclosed herein is depicted. As shown, the emitter 120 may be configured to emit signals having a fan beam pattern 502. The fan beam pattern 502 may have a narrow beam width in one dimension and a wider beam width in the other dimension. For example, suitable fan beam patterns may have a narrow beam width of less than 1 degree of spread (e.g., about 0.1 degree of spread) and a wider beam width of less than 120 degrees (e.g., about 10 degree of spread) of spread.

Figure 6:
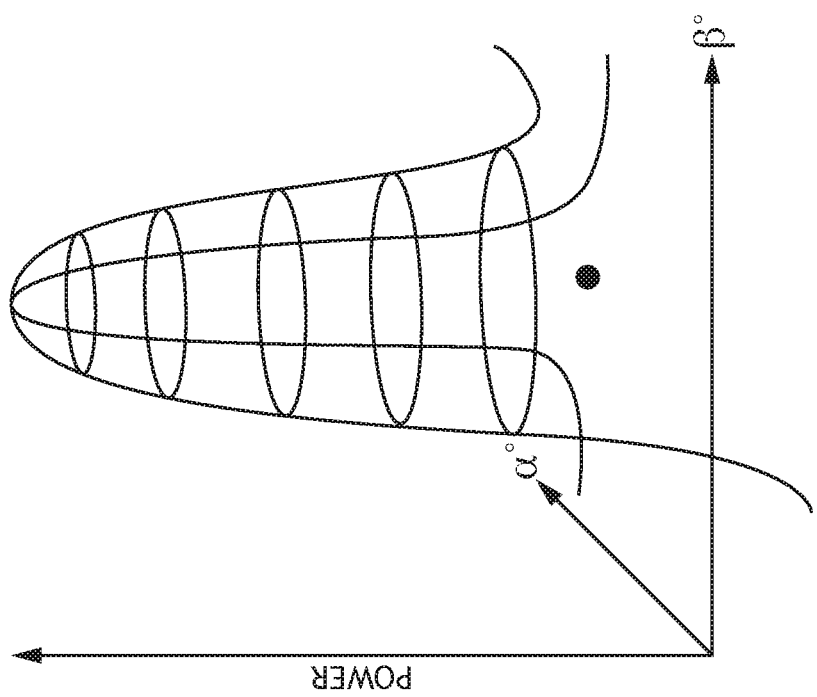
FIG. 6 is a graph of angles versus received power with respect to the emitter of FIG. 5 according to the inventive concepts disclosed herein.

Referring now to FIG. 6, a graph of angles versus received power (e.g., by a receiver 122) with respect to the emitter 120 having fan beam pattern 502 of FIG. 5 is shown. The graph demonstrate that received signal intensities are present along a strip of angles corresponding to the fan beam pattern 502.

While FIGS. 3 and 5 exemplarily show that emitters 120 may have pencil beam patterns 302 or fan beam patterns 502, in some embodiments, the emitters 120 may have other beam patterns, such as omnidirectional beam patterns.

Figure 7:
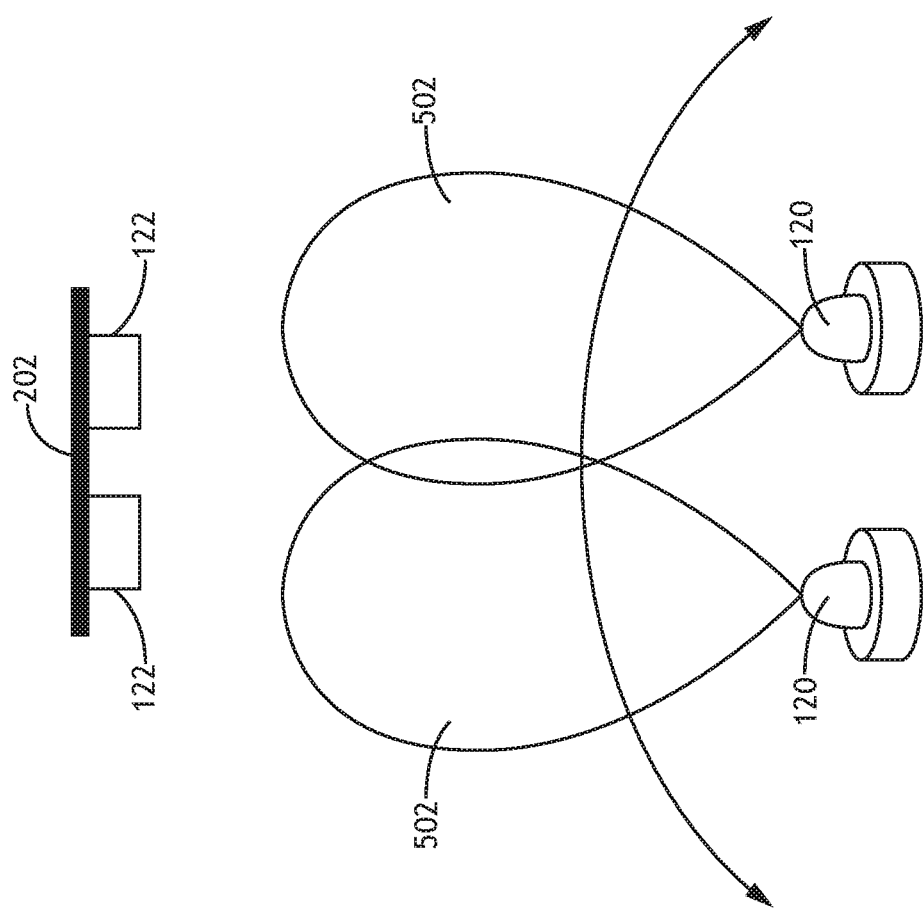
FIG. 7 is a view of two emitters of FIG. 1 according to the inventive concepts disclosed herein.

Referring now to FIG. 7, an exemplary embodiment of two emitters 120 according to the inventive concepts disclosed herein is depicted. As shown, the emitters 120 may be configured to emit signals having overlapping fan beam patterns 502.

Figure 8:
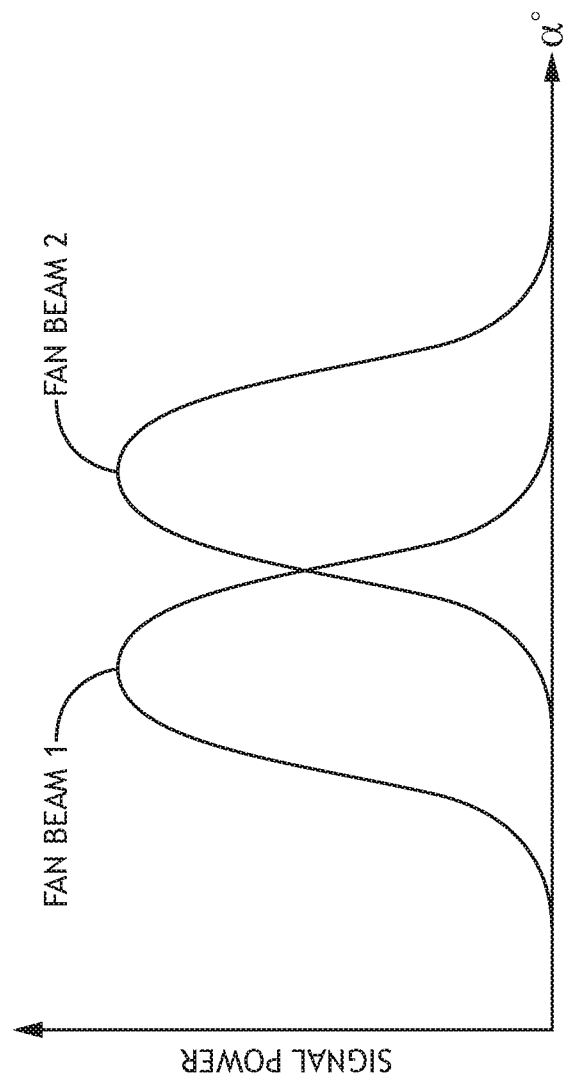
FIG. 8 is a graph of angle versus received power with respect to the emitters of FIG. 7 according to the inventive concepts disclosed herein.

Referring now to FIG. 8, a graph of an angle versus received power (e.g., by a receiver 122) with respect to the emitters 120 having fan beam patterns 502 of FIG. 7 is shown. As shown, an angle of head movement can be determined by comparing (e.g., using the ratios of) signal strengths for the two emitters 120 at angles between the peak intensities for fan beam 1 and fan beam 2 as plotted in the graph. This information can be used by the processor 114 to determine angular orientations of the emitters 120 with respect to the at least one structure 202.

Figure 9:
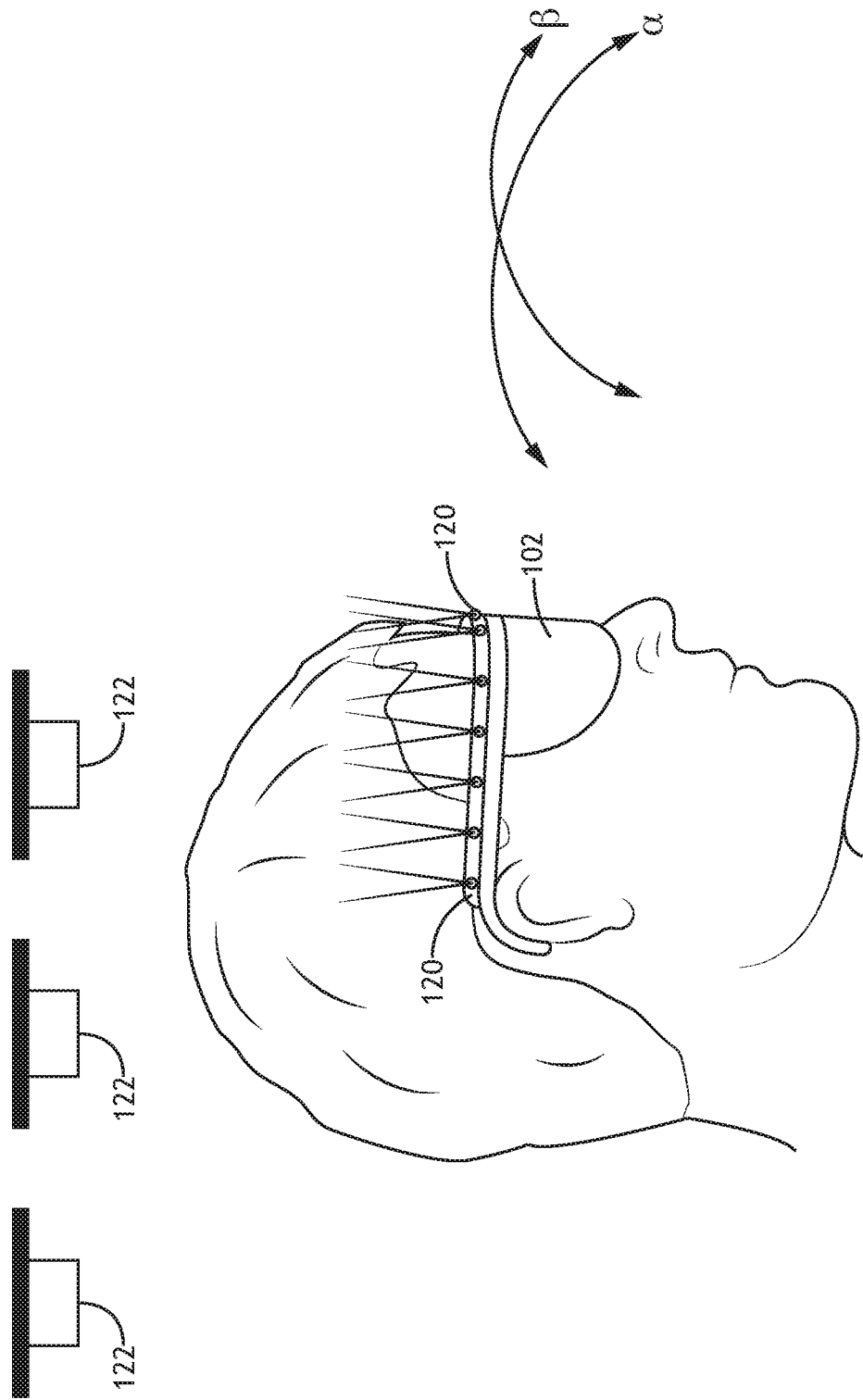
FIG. 9 is a view of an exemplary embodiment of the system of FIG. 1 according to the inventive concepts disclosed herein.

Referring now to FIG. 9, an exemplary embodiment of the system 100 of FIG. 1 according to the inventive concepts disclosed herein is depicted. Emitters 120 may be implemented on head wearable device 102, which is exemplarily depicted as a transparent visor head wearable display device. The emitters 120 may be implemented along temple bars and a brow bar of the head wearable device 102. The receivers 122 may be configured to receive emitted signals from the emitters 120 while the head may move in angles alpha and beta.

Figure 10:
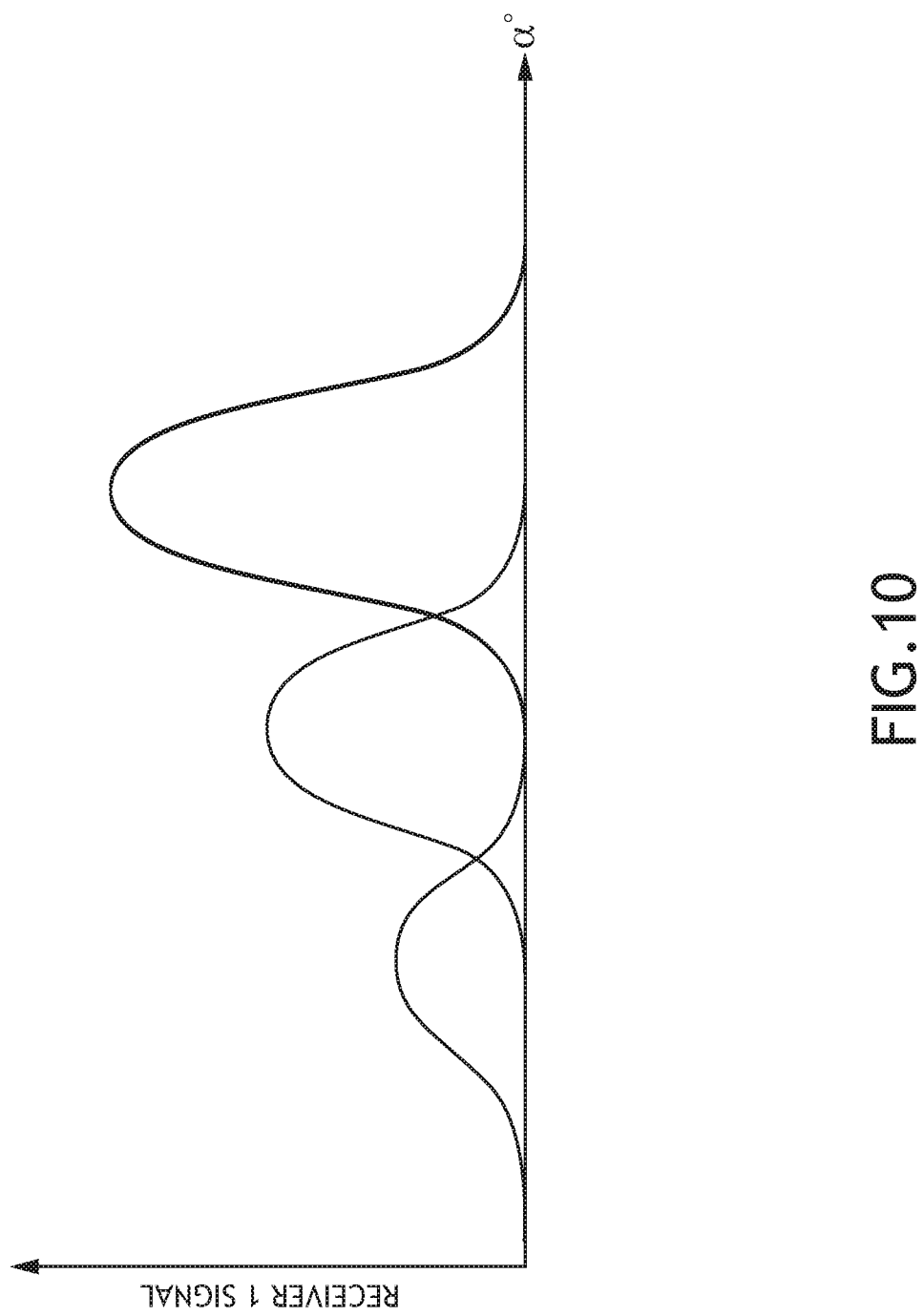
FIG. 10 is a graph of angle versus received power with respect to three emitters of FIG. 9 according to the inventive concepts disclosed herein.

Referring now to FIG. 10, a graph of an angle versus received power (e.g., by a first receiver 122 or a first cluster of three collocated receivers 122) with respect to three emitters 120 having fan beam patterns 502 of FIG. 9 is shown. A plot of received signal strengths of the three emitters 120 received by at least one first matched receiver 122 (e.g., a first receiver 122 or a first cluster of three collocated receivers 122), which may be configured to receive unique or semi-unique signals from the three emitters 120, is shown. As shown, an angle alpha of head movement can be determined by comparing (e.g., using the ratios of) signal strengths for the three emitters 120 at angles between the peak intensities for the three fan beam patterns as plotted in the graph. This information can be used by the processor 114 to determine angular orientations of the emitters 120 with respect to the at least one structure 202.

Figure 11:
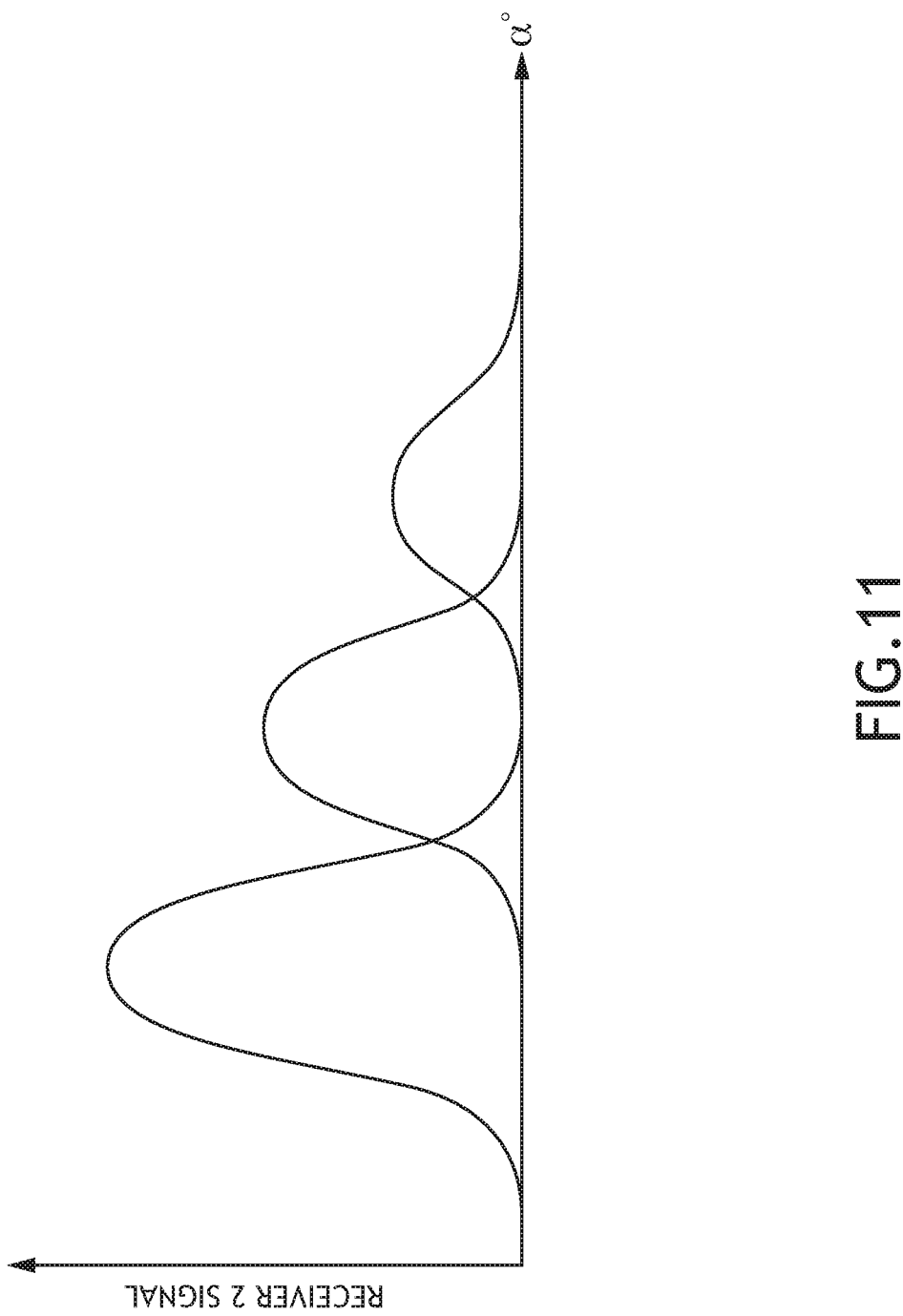
FIG. 11 is a graph of angle versus received power with respect to three emitters of FIG. 9 according to the inventive concepts disclosed herein.

Referring now to FIG. 11, a graph of an angle versus received power (e.g., by a second receiver 122 or a second cluster of three collocated receivers 122) with respect to three emitters 120 having fan beam patterns 502 of FIG. 9 is shown. A plot of received signal strengths of the three emitters 120 received by at least one second matched receiver 122 (e.g., a second receiver 122 or a second cluster of three collocated receivers 122), which may be configured to receive unique or semi-unique signals from the three emitters 120, is shown. As shown, an angle alpha of head movement can be determined by comparing (e.g., using the ratios of) signal strengths for the three emitters 120 at angles between the peak intensities for the three fan beam patterns as plotted in the graph. This information can be used by the processor 114 to determine angular orientations of the emitters 120 with respect to the at least one structure 202.

Additionally, by using the angular orientation information obtainable from FIGS. 10-11 and based on known (e.g., stored in memory 116) positions of the three emitters 120 relative to each other on the head wearable device 102, the processor 114 may be configured to determine three dimensional positions of the three emitters 120, and likewise, the processor may determine a position and orientation of the head wearable device 102 such that image and/or geo-referenced symbolic data can be generated that is aligned with a field of view of a wearer of the head wearable device 102.

Figure 12:
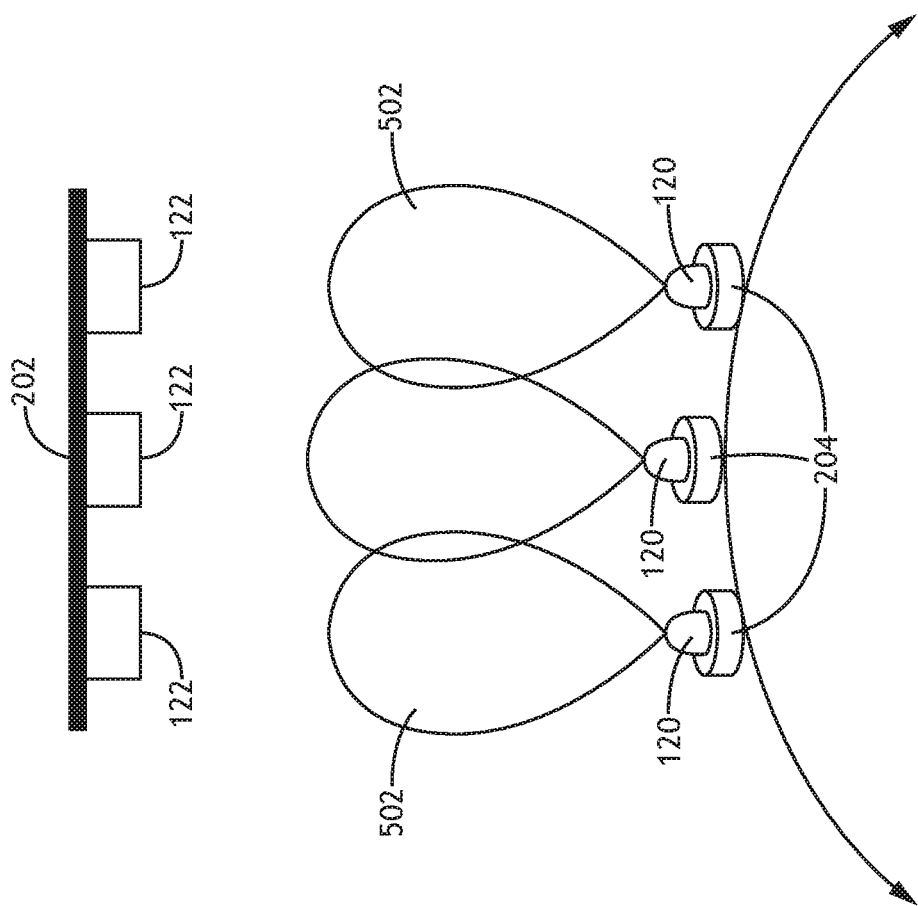
FIG. 12 is a view of three emitters of FIG. 1 according to the inventive concepts disclosed herein.

Referring now to FIG. 12, an exemplary embodiment of three emitters 120 according to the inventive concepts disclosed herein is depicted. As shown, the emitters 120 may be configured to emit signals having overlapping fan beam patterns 502.

Figure 13:
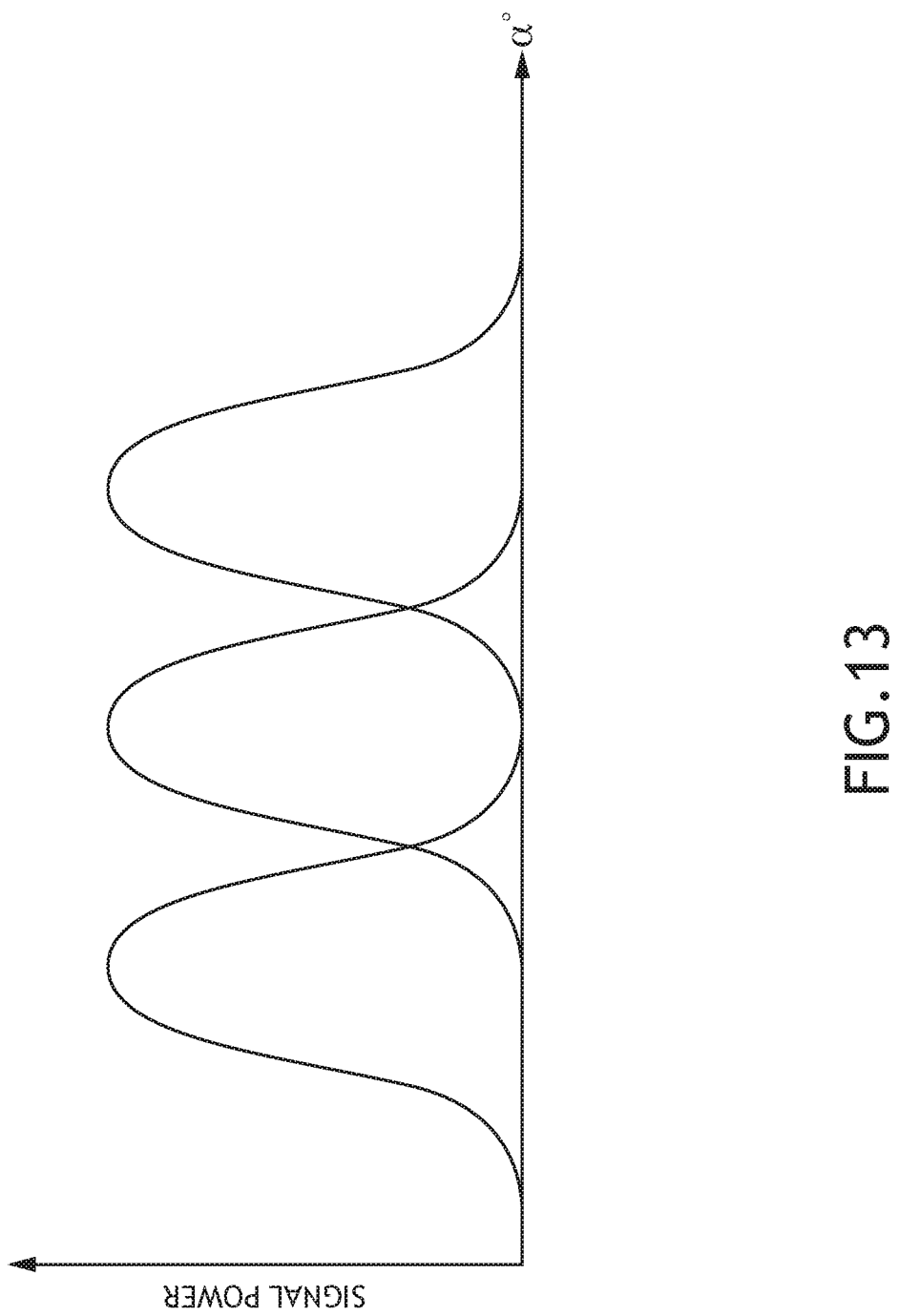
FIG. 13 is a graph of angle versus received power with respect to the three emitters of FIG. 12 according to the inventive concepts disclosed herein.

Referring now to FIG. 13, a graph of an angle versus received power (e.g., by a receiver 122) with respect to the emitters 120 having fan beam patterns 502 of FIG. 12 is shown. As shown, an angle of head movement can be determined by comparing (e.g., using the ratios of) signal strengths for the three emitters 120 at angles between the peak intensities for the three fan beams as plotted in the graph. This information can be used by the processor 114 to determine angular orientations of the emitters 120 with respect to the at least one structure 202.

Figure 14:
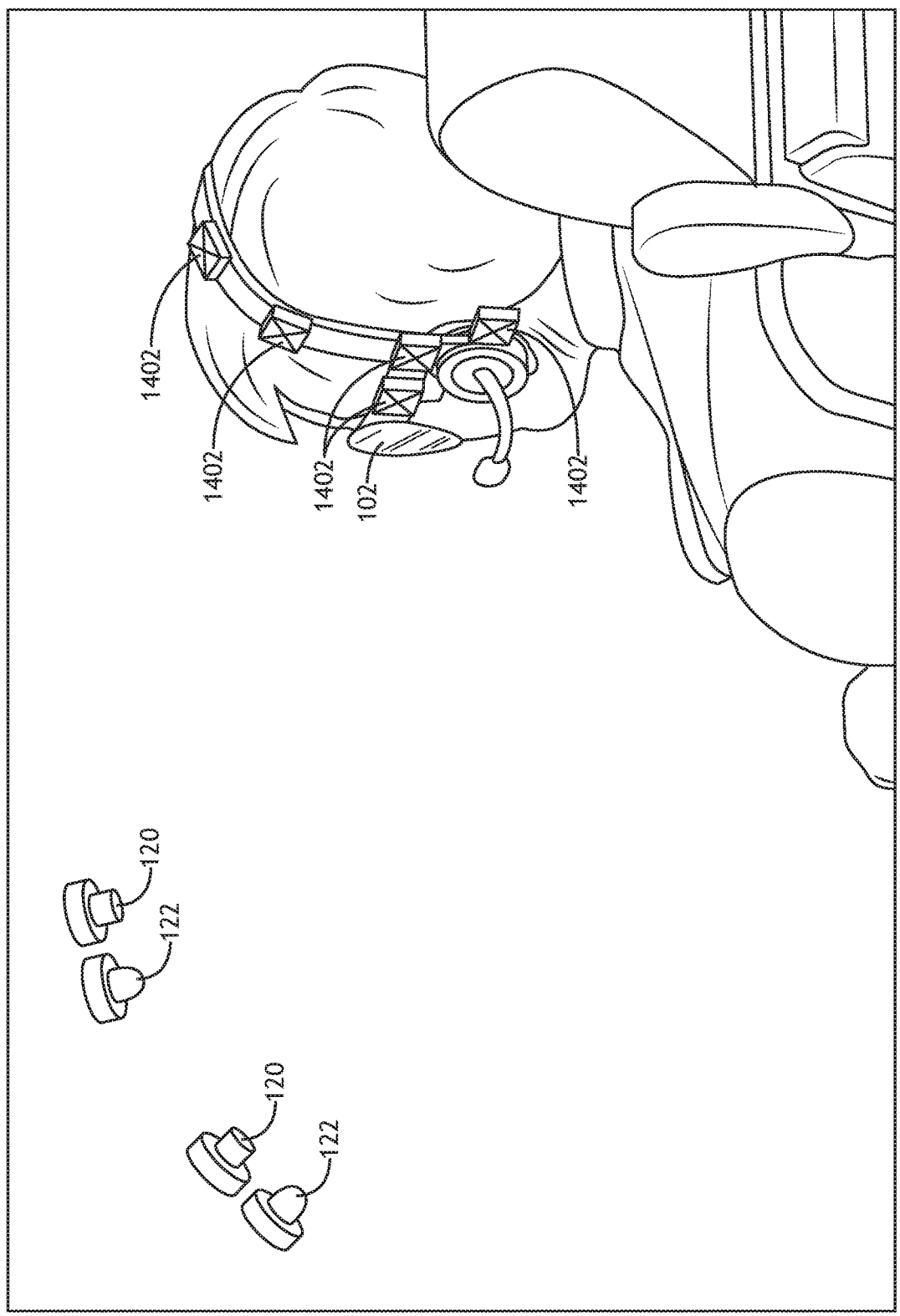
FIG. 14 is a view of an exemplary embodiment of the system of FIG. 1 according to the inventive concepts disclosed herein.

Referring now to FIG. 14, an exemplary embodiment of the system 100 of FIG. 1 according to the inventive concepts disclosed herein is depicted. The system 100 may include reflectors 1402 implemented on the head wearable device 102. In some embodiments, the head wearable device 102 may lack emitters 120 and receivers 122 so as to reduce a weight and size of the head wearable device and to reduce power requirements for the head wearable device 102. Emitters 120 and receivers 122 may be implemented on the at least one structure (e.g., at least one cockpit structure). The emitters 120 may be configured to emit signals toward the head wearable device 102. The reflectors 1402 may be configured to reflect at least a portion of the emitted signals back toward the receivers 122. The receivers 122 may be configured to receive reflected signals from the reflectors 1402 while the head associated with the head wearable device 102 may move and to output electromagnetic signal data to the processor 114. The processor 114 may be configured to determine a position and an orientation of the head wearable device 102 at a given time based at least on the electromagnetic signal data received from the receivers 122.

Figure 15:
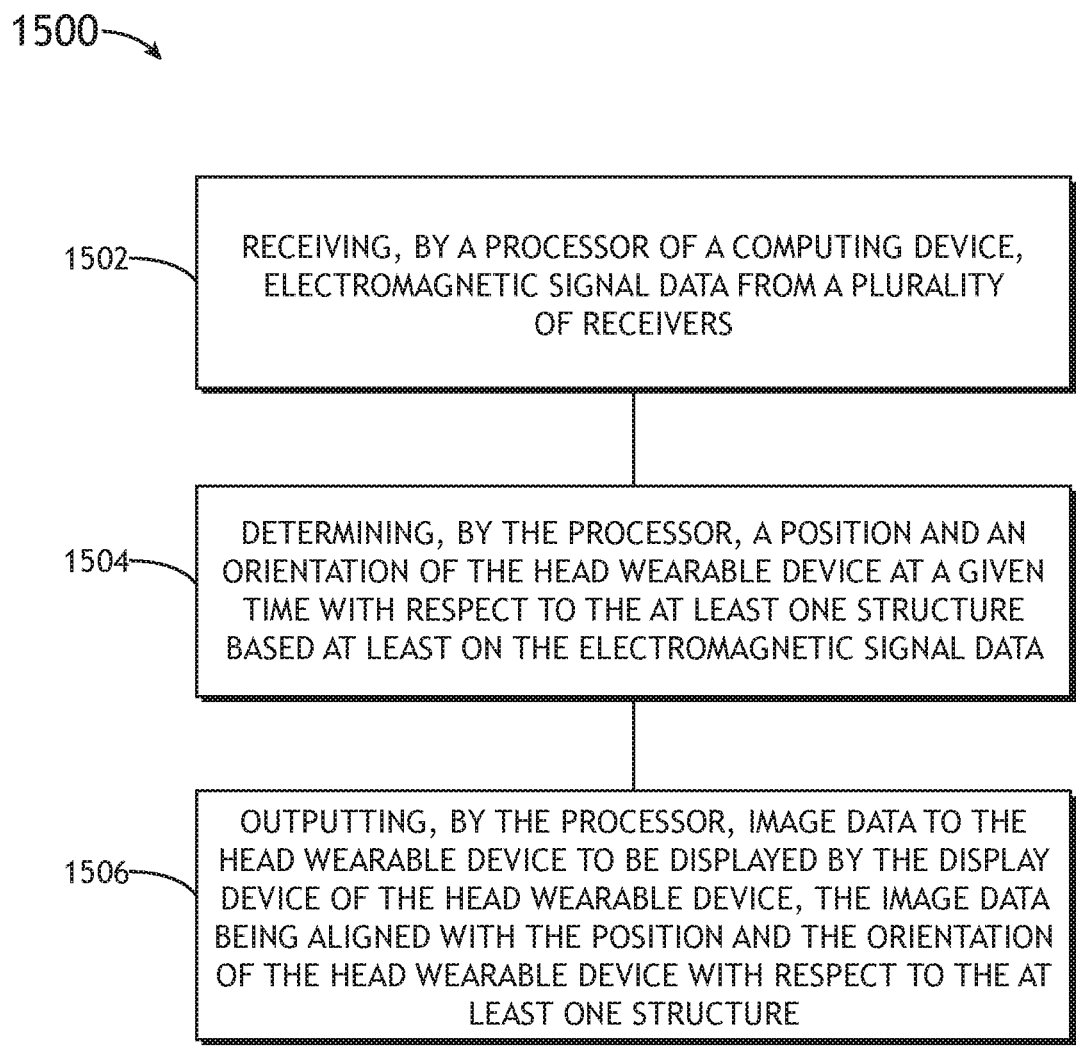
FIG. 15 is a diagram of an exemplary embodiment of a method for operating a head tracking system according to the inventive concepts disclosed herein.

Referring now to FIG. 15, an exemplary embodiment of a method 1500 for operating a system 100 (e.g., a head tracking system) according to the inventive concepts disclosed herein may include one or more of the following steps. Additionally, for example, some embodiments may include performing one more instances of the method 1500 iteratively, concurrently, and/or sequentially.

A step 1502 may include receiving, by a processor of a computing device, electromagnetic signal data from a plurality of receivers. The plurality of receivers may be configured to receive at least some of electromagnetic signals from a plurality of emitters, to detect at least one signal property including signal intensity of the at least some of the electromagnetic signals, and to output information of the at least one signal property as the electromagnetic signal data to the computing device. The plurality of receivers may be implemented on at least one of at least one structure or a head wearable device. The plurality of emitters may be configured to emit the electromagnetic signals. The plurality of emitters may be implemented on at least one of the at least one structure or the head wearable device. The head wearable device may be implemented in proximity to the at least one structure. The head wearable device may include a head wearable device processor and at least one display device. The computing device may be communicatively coupled to the head wearable device and the plurality of receivers.

A step 1504 may include determining, by the processor, a position and an orientation of the head wearable device at a given time with respect to the at least one structure based at least on the electromagnetic signal data.

A step 1506 may include outputting, by the processor, image and/or geo-referenced symbolic data to the head wearable device to be displayed by the display device of the head wearable device, the image and/or geo-referenced symbolic data being aligned with the position and the orientation of the head wearable device with respect to the at least one structure.

Further, the method 1500 may include any of the operations disclosed throughout.

As will be appreciated from the above, embodiments of the inventive concepts disclosed herein may be directed to a method, a system, and a head wearable display device.

As used throughout and as would be appreciated by those skilled in the art, "at least one non-transitory computer-readable medium" may refer to as at least one non-transitory computer-readable medium (e.g., memory 108, memory 116, storage 110, storage 118 or a combination thereof; e.g., at least one computer-readable medium implemented as hardware; e.g., at least one non-transitory processor-readable medium, at least one memory (e.g., at least one non-volatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    at least one structure;
    a head wearable device implemented in proximity to the at least one structure, the head wearable device comprising a head wearable device processor and at least one display device;
    a plurality of emitters configured to emit electromagnetic signals, the plurality of emitters implemented on at least one of the at least one structure or the head wearable device;
    a plurality of receivers configured to receive at least some of the electromagnetic signals from the plurality of emitters, to detect at least one signal property including signal intensity of the at least some of the electromagnetic signals, and to output information of the at least one signal property as electromagnetic signal data, the plurality of receivers implemented on at least one of the at least one structure or the head wearable device;
    a computing device comprising a processor, the computing device communicatively coupled to the head wearable device and the plurality of receivers, the processor configured to:
        receive the electromagnetic signal data from the plurality of receivers;
        determine a position and an orientation of the head wearable device at a given time with respect to the at least one structure based at least on the electromagnetic signal data; and
        output at least one of image or symbolic data to the head wearable device to be displayed by the display device of the head wearable device, the at least one of image or symbolic data being aligned with the position and the orientation of the head wearable device with respect to the at least one structure,
    wherein the at least one structure is implemented in or on a vehicle, wherein the processor is further configured to determine a position and an orientation of the vehicle with respect to earth and to determine a position and orientation of the head wearable device with respect to the at least one structure and to earth based at least on the electromagnetic signal data, wherein the at least one of image or symbolic data is aligned with the position and the orientation of the head wearable device with respect to the at least one structure and to earth.

2. The system of claim 1, wherein the vehicle is an aircraft, wherein the at least one structure is at least one cockpit structure, wherein the head wearable device is implemented in a cockpit of the aircraft.

3. The system of claim 1, wherein each of at least some of the plurality of receivers is configured to receive particular electromagnetic signals from a particular emitter of the plurality of emitters.

4. The system of claim 1, wherein each of at least some of the plurality of emitters is configured to emit particular electromagnetic signals having particular unique signal properties, the particular unique signal properties including at least one of an at least semi-unique pulse frequency, an at least semi-unique signal code, an at least semi-unique polarization, or an at least semi-unique signal wavelength, wherein each of at least some of the plurality of receivers is configured to receive the particular electromagnetic signals having the particular unique signal properties from a particular emitter and to filter out electromagnetic signals other than the particular electromagnetic signals having the particular unique signal properties.

5. The system of claim 4, wherein the particular unique signal properties include the at least semi-unique pulse frequency.

6. The system of claim 1, wherein at least some of the plurality of emitters are implemented on the head wearable device, wherein at least some of the plurality of receivers are implemented on the at least one structure.

7. The system of claim 6, wherein the processor being configured to determine the position and the orientation of the head wearable device at the given time with respect to the at least one structure based at least on the electromagnetic signal data comprises the processor being further configured to:
    identify particular emitters of the plurality of emitters based at least on particular unique signal properties associated with the particular emitters, the particular emitters implemented on the head wearable device; and
    determine angular orientations and three-dimensional positions of the particular emitters of the plurality of emitters with respect to the at least one structure at the given time at least by comparing received signal strengths associated with at least one of the particular emitters against received signal strengths associated with at least another of the particular emitters.

8. The system of claim 6, wherein the at least some of the plurality of emitters implemented on the head wearable device are implemented in clusters of at least two emitters, the at least two emitters of each cluster arranged generally linearly, the clusters including a first cluster and a second cluster, wherein the first cluster and the second cluster are arranged in a non-parallel manner.

9. The system of claim 1, wherein at least some of the plurality of emitters are implemented on the at least one structure, wherein at least some of the plurality of receivers are implemented on the head wearable device.

10. The system of claim 9, wherein the processor being configured to determine the position and the orientation of the head wearable device at the given time with respect to the at least one structure based at least on the electromagnetic signal data comprises the processor being further configured to:
   identify particular emitters of the plurality of emitters based at least on particular unique signal properties associated with the particular emitters; and
   determine angular orientations and three-dimensional positions of particular receivers of the plurality of receivers with respect to the at least one structure at the given time at least by comparing received signal strengths associated with at least one of the particular emitters against received signal strengths associated with at least another of the particular emitters, the particular receivers implemented on the head wearable device.

11. The system of claim 9, wherein the at least some of the plurality of receivers implemented on the head wearable device are implemented in clusters of at least two receivers, the at least two receivers of each cluster arranged generally linearly, the clusters including a first cluster and a second cluster, wherein the first cluster and the second cluster are arranged in a non-parallel manner.

12. The system of claim 1, wherein some of the plurality of emitters are implemented on the at least one structure and other emitters of the plurality of emitters are implemented on the head wearable device, wherein some of the plurality of receivers are implemented on the at least one structure and other of the plurality of receivers are implemented on the head wearable device.

13. The system of claim 12, wherein the processor being configured to determine the position and the orientation of the head wearable device at the given time with respect to the at least one structure based at least on the electromagnetic signal data comprises the processor being further configured to:
   identify particular emitters of the plurality of emitters based at least on particular unique signal properties associated with the particular emitters, the particular emitters implemented on the head wearable device;
   determine angular orientations and three-dimensional positions of the particular emitters of the plurality of emitters with respect to the at least one structure at the given time at least by comparing received signal strengths associated with at least one of the particular emitters against received signal strengths associated with at least another of the particular emitters;
   determine angular orientations and three-dimensional positions of particular receivers of the plurality of receivers with respect to the at least one structure at the given time at least by comparing received signal strengths associated with at least one of the other emitters against received signal strengths associated with at least another of the other emitters, the particular receivers implemented on the head wearable device; and
   determine the position and the orientation of the head wearable device at the given time with respect to the at least one structure based at least on the determined angular orientations and three-dimensional positions of the particular emitters and the determined angular orientations and three-dimensional positions of the particular receivers.

14. The system of claim 1, wherein at least some of the plurality of emitters are configured to emit electromagnetic signals in fan beam patterns.

15. The system of claim 1, wherein at least two of the plurality of emitters are configured to emit electromagnetic signals in overlapping fan beam patterns.

16. The system of claim 1, wherein at least some of the plurality of emitters are configured to emit infrared signals.

17. The system of claim 1, wherein the plurality of emitters and the plurality of receivers are implemented on the at least one structure, wherein the head wearable device includes a plurality of reflectors configured to reflect emitted signals from one or more of the plurality of emitters to one or more of the plurality of receivers.

18. A cockpit head tracking system, comprising:
   at least one cockpit structure implemented in an aircraft;
   a head wearable device implemented in proximity to the at least one cockpit structure, the head wearable device comprising a head wearable device processor and at least one display device, wherein the head wearable device is implemented in a cockpit of the aircraft;
   a plurality of emitters configured to emit electromagnetic signals, the plurality of emitters implemented on at least one of the at least one cockpit structure or the head wearable device;
   a plurality of receivers configured to receive at least some of the electromagnetic signals from the plurality of emitters, to detect at least one signal property including signal intensity of the at least some of the electromagnetic signals, and to output information of the at least one signal property as electromagnetic signal data, the plurality of receivers implemented on at least one of the at least one cockpit structure or the head wearable device;
   an avionics computing device comprising a processor, the computing device communicatively coupled to the head wearable device and the plurality of receivers, the processor configured to:
      receive the electromagnetic signal data from the plurality of receivers;
      determine a position and an orientation of the aircraft with respect to earth;
      determine a position and orientation of the head wearable device with respect to the at least one cockpit structure and to earth based at least on the electromagnetic signal data; and
      output at least one of image or symbolic data to the head wearable device to be displayed by the display device of the head wearable device, wherein the at least one of image or symbolic data is aligned with the position and the orientation of the head wearable device with respect to the at least one cockpit structure and to earth.

19. A method of operating a head tracking system, comprising:
   receiving, by a processor of a computing device, electromagnetic signal data from a plurality of receivers, the plurality of receivers configured to receive at least some of electromagnetic signals from a plurality of emitters, to detect at least one signal property including signal intensity of the at least some of the electromagnetic signals, and to output information of the at least one signal property as the electromagnetic signal data to the computing device, the plurality of receivers implemented on at least one of at least one structure or a head wearable device, the plurality of emitters configured to emit the electromagnetic signals, the plurality of emitters implemented on at least one of the at least one structure or the head wearable device, the head wearable device implemented in proximity to the at least one structure, the head wearable device comprising a head wearable device processor and at least one display device, the computing device communicatively coupled to the head wearable device and the plurality of receivers;

determining, by the processor, a position and an orientation of the head wearable device at a given time with respect to the at least one structure based at least on the electromagnetic signal data; and outputting, by the processor, at least one of image or symbolic data to the head wearable device to be displayed by the display device of the head wearable device, the at least one of image or symbolic data being aligned with the position and the orientation of the head wearable device with respect to the at least one structure, wherein the at least one structure is implemented in or on a vehicle, wherein the processor is further configured to determine a position and an orientation of the vehicle with respect to earth and to determine a position and orientation of the head wearable device with respect to the at least one structure and to earth based at least on the electromagnetic signal data, wherein the at least one of image or symbolic data is aligned with the position and the orientation of the head wearable device with respect to the at least one structure and to earth.

20. A system, comprising:

at least one structure;

a head wearable device implemented in proximity to the at least one structure, the head wearable device comprising a head wearable device processor and at least one display device;

a plurality of emitters configured to emit electromagnetic signals, the plurality of emitters implemented on at least one of the at least one structure or the head wearable device;

a plurality of receivers configured to receive at least some of the electromagnetic signals from the plurality of emitters, to detect at least one signal property including signal intensity of the at least some of the electromagnetic signals, and to output information of the at least one signal property as electromagnetic signal data, the plurality of receivers implemented on at least one of the at least one structure or the head wearable device;

a computing device comprising a processor, the computing device communicatively coupled to the head wearable device and the plurality of receivers, the processor configured to:

receive the electromagnetic signal data from the plurality of receivers;

determine a position and an orientation of the head wearable device at a given time with respect to the at least one structure based at least on the electromagnetic signal data; and output at least one of image or symbolic data to the head wearable device to be displayed by the display device of the head wearable device, the at least one of image or symbolic data being aligned with the position and the orientation of the head wearable device with respect to the at least one structure, wherein at least some of the plurality of emitters are implemented on the head wearable device, wherein at least some of the plurality of receivers are implemented on the at least one structure, wherein the processor being configured to determine the position and the orientation of the head wearable device at the given time with respect to the at least one structure based at least on the electromagnetic signal data comprises the processor being further configured to:

identify particular emitters of the plurality of emitters based at least on particular unique signal properties associated with the particular emitters, the particular emitters implemented on the head wearable device; and determine angular orientations and three-dimensional positions of the particular emitters of the plurality of emitters with respect to the at least one structure at the given time at least by comparing received signal strengths associated with at least one of the particular emitters against received signal strengths associated with at least another of the particular emitters.

21. A system, comprising:

at least one structure;

a head wearable device implemented in proximity to the at least one structure, the head wearable device comprising a head wearable device processor and at least one display device;

a plurality of emitters configured to emit electromagnetic signals, the plurality of emitters implemented on at least one of the at least one structure or the head wearable device;

a plurality of receivers configured to receive at least some of the electromagnetic signals from the plurality of emitters, to detect at least one signal property including signal intensity of the at least some of the electromagnetic signals, and to output information of the at least one signal property as electromagnetic signal data, the plurality of receivers implemented on at least one of the at least one structure or the head wearable device;

a computing device comprising a processor, the computing device communicatively coupled to the head wearable device and the plurality of receivers, the processor configured to:

receive the electromagnetic signal data from the plurality of receivers;

determine a position and an orientation of the head wearable device at a given time with respect to the at least one structure based at least on the electromagnetic signal data; and output at least one of image or symbolic data to the head wearable device to be displayed by the display device of the head wearable device, the at least one of image or symbolic data being aligned with the position and the orientation of the head wearable device with respect to the at least one structure, wherein at least some of the plurality of emitters are implemented on the at least one structure, wherein at least some of the plurality of receivers are implemented on the head wearable device, wherein the processor being configured to determine the position and the orientation of the head wearable device at the given time with respect to the at least one structure based at least on the electromagnetic signal data comprises the processor being further configured to:

identify particular emitters of the plurality of emitters based at least on particular unique signal properties associated with the particular emitters; and determine angular orientations and three-dimensional positions of particular receivers of the plurality of receivers with respect to the at least one structure at the given time at least by comparing received signal strengths associated with at least one of the particular emitters against received signal strengths associated with at least another of the particular emitters, the particular receivers implemented on the head wearable device.

22. A system, comprising:

at least one structure;

a head wearable device implemented in proximity to the at least one structure, the head wearable device comprising a head wearable device processor and at least one display device;

a plurality of emitters configured to emit electromagnetic signals, the plurality of emitters implemented on at least one of the at least one structure or the head wearable device;

a plurality of receivers configured to receive at least some of the electromagnetic signals from the plurality of emitters, to detect at least one signal property including signal intensity of the at least some of the electromagnetic signals, and to output information of the at least one signal property as electromagnetic signal data, the plurality of receivers implemented on at least one of the at least one structure or the head wearable device;

a computing device comprising a processor, the computing device communicatively coupled to the head wearable device and the plurality of receivers, the processor configured to:

receive the electromagnetic signal data from the plurality of receivers;

determine a position and an orientation of the head wearable device at a given time with respect to the at least one structure based at least on the electromagnetic signal data; and output at least one of image or symbolic data to the head wearable device to be displayed by the display device of the head wearable device, the at least one of image or symbolic data being aligned with the position and the orientation of the head wearable device with respect to the at least one structure, wherein some of the plurality of emitters are implemented on the at least one structure and other emitters of the plurality of emitters are implemented on the head wearable device, wherein some of the plurality of receivers are implemented on the at least one structure and other of the plurality of receivers are implemented on the head wearable device, wherein the processor being configured to determine the position and the orientation of the head wearable device at the given time with respect to the at least one structure based at least on the electromagnetic signal data comprises the processor being further configured to:

identify particular emitters of the plurality of emitters based at least on particular unique signal properties associated with the particular emitters, the particular emitters implemented on the head wearable device;

determine angular orientations and three-dimensional positions of the particular emitters of the plurality of emitters with respect to the at least one structure at the given time at least by comparing received signal strengths associated with at least one of the particular emitters against received signal strengths associated with at least another of the particular emitters;

determine angular orientations and three-dimensional positions of particular receivers of the plurality of receivers with respect to the at least one structure at the given time at least by comparing received signal strengths associated with at least one of the other emitters against received signal strengths associated with at least another of the other emitters, the particular receivers implemented on the head wearable device; and determine the position and the orientation of the head wearable device at the given time with respect to the at least one structure based at least on the determined angular orientations and three-dimensional positions of the particular emitters and the determined angular orientations and three-dimensional positions of the particular receivers.

* * * * *